(12) United States Patent
Poiger et al.

(10) Patent No.: US 12,429,554 B2
(45) Date of Patent: Sep. 30, 2025

(54) RADAR SIDE-SHIELD AND A RADAR TRANSCEIVER ASSEMBLY

(71) Applicant: QUALCOMM AUTO LTD., Cambridge (GB)

(72) Inventors: Walter Poiger, Niederwerrn (DE); Pascal Lore, Yokohama (JP); Krishnakant Nainwal, Bangalore (IN); Kai Yang, Lowell, MA (US); Jonathan Moss, Unterschleissheim (DE)

(73) Assignee: Qualcomm Auto Ltd., San Diego, CA (US)

( * ) Notice: Subject to any disclaimer, the term of this patent is extended or adjusted under 35 U.S.C. 154(b) by 338 days.

(21) Appl. No.: 17/763,465

(22) PCT Filed: Sep. 22, 2020

(86) PCT No.: PCT/EP2020/076356
§ 371 (c)(1),
(2) Date: Mar. 24, 2022

(87) PCT Pub. No.: WO2021/058450
PCT Pub. Date: Apr. 1, 2021

(65) Prior Publication Data
US 2022/0349990 A1    Nov. 3, 2022

(30) Foreign Application Priority Data

Sep. 24, 2019  (EP) ..................... 19199391

(51) Int. Cl.
*G01S 7/02*         (2006.01)
*G01S 13/931*       (2020.01)
*H01Q 15/02*        (2006.01)
(52) U.S. Cl.
CPC ............ *G01S 7/028* (2021.05); *G01S 13/931* (2013.01); *H01Q 15/02* (2013.01)

(58) Field of Classification Search
CPC .......... G01S 7/028; G01S 13/931; G01S 7/03; G01S 7/038; G01S 7/282; G01S 7/285;
(Continued)

(56) References Cited

U.S. PATENT DOCUMENTS 4,148,039 A      4/1979   Lunden
4,179,699 A  *  12/1979   Lunden .................. H01Q 1/424
                                                    343/872
(Continued)

FOREIGN PATENT DOCUMENTS

CN       103616683 A    3/2014
CN       104466425 A    3/2015
(Continued)

OTHER PUBLICATIONS

CN108016388A_Description_20240430_1101.pdf—translation of CN108016388A (Year: 2018).*
(Continued)

*Primary Examiner* — Vladimir Magloire
*Assistant Examiner* — Yonghong Li
(74) *Attorney, Agent, or Firm* — Qualcomm Auto Ltd.

(57) ABSTRACT

A side-shield (310) for a radar transceiver (130), the side-shield (310) including a non-uniform delay structure arranged over an extension plane of the side-shield, the non-uniform delay structure being configured to delay a radar signal (220, 320) propagating through the side-shield (310) by a variable amount in dependence of a wavelength of the radar signal and in dependence of a location on the extension plane, thereby steering and/or diffusing the radar signal (320) after propagation through the side-shield (310).

16 Claims, 5 Drawing Sheets

(58) Field of Classification Search
CPC ........... G01S 7/352; G01S 2013/93271; G01S 2013/93275; H01Q 15/02; H01Q 1/3233; H01Q 1/421; H01Q 19/10
See application file for complete search history.

(56) References Cited

U.S. PATENT DOCUMENTS

| | | | |
|---|---|---|---|
| 4,901,080 A | 2/1990 | McHenry | |
| 5,298,906 A | 3/1994 | Lantagne et al. | |
| 5,925,455 A * | 7/1999 | Bruzzone | H05B 6/6491 |
| | | | 428/328 |
| 6,937,184 B2 * | 8/2005 | Fujieda | H01Q 1/42 |
| | | | 342/198 |
| 7,126,525 B2 * | 10/2006 | Suzuki | H01Q 17/001 |
| | | | 342/175 |
| 9,110,162 B2 * | 8/2015 | Matsuzawa | H01Q 1/421 |
| 9,780,443 B2 | 10/2017 | Fujita | |
| 10,510,535 B2 | 12/2019 | Gilet et al. | |
| 10,644,408 B2 | 5/2020 | Sakai et al. | |
| 10,754,026 B2 * | 8/2020 | Callewaert | G01S 13/88 |
| 10,871,564 B2 * | 12/2020 | Kocharyan | H01Q 1/42 |
| 2009/0058739 A1 | 3/2009 | Konishi | |
| 2014/0070982 A1 * | 3/2014 | Inada | B60R 19/483 |
| | | | 342/385 |
| 2014/0159942 A1 | 6/2014 | Shi et al. | |
| 2015/0123872 A1 | 5/2015 | Fujita et al. | |
| 2015/0207217 A1 | 7/2015 | Fujita | |
| 2016/0268693 A1 * | 9/2016 | Ding | H01Q 1/526 |
| 2016/0370456 A1 | 12/2016 | Emanuelsson | |
| 2018/0211829 A1 | 7/2018 | Gilet et al. | |
| 2019/0067827 A1 | 2/2019 | Sakai et al. | |

FOREIGN PATENT DOCUMENTS

| | | | | |
|---|---|---|---|---|
| CN | 106257304 A | | 12/2016 | |
| CN | 108016388 A | * | 5/2018 | ........... B60R 19/023 |
| CN | 109565116 A | | 4/2019 | |
| CN | 110036532 A | | 7/2019 | |
| DE | 102009042285 A1 | | 3/2011 | |
| DE | 102010028185 A1 | | 10/2011 | |
| EP | 3088853 A2 | | 11/2016 | |
| EP | 3323151 A1 | | 5/2018 | |
| JP | 2018028551 A | | 2/2018 | |
| RU | 2172047 C2 | | 8/2001 | |
| WO | 2008029928 A1 | | 3/2008 | |

OTHER PUBLICATIONS

RadarFundamentals.pdf from https://web.archive.org/web/20160617184746/http://faculty.nps.edu/jenn/seminars/radarFundamentals.pdf (Year: 2016).*
Starkov_2016_J._Phys._Conf._Ser._741_012004.pdf (Year: 2016).*
Relative permittivity—Wikipedia.pdf (Year: 2019).*
International Search Report and Written Opinion on PCT/EP2020/076356, mailed Dec. 18, 2020.
European Search Report—EP19199391—Search Authority—Munich—Apr. 1, 2020.
Xiao Chun L., et al., "A Method of Bi-Directionally Changing-Thickness Design for Airborne Broadband Radome", Radar Science and Technology, vol. 12, No. 1, Feb. 15, 2014, pp. 101-105.
Zaker R., "Wideband Radar Cross Section Reduction Using a Novel Design of Artificial Magnetic Conductor Structure with a Triple-layer Chessboard Configuration", International Journey of RF and Microwave Computer-Aided Engineering, vol. 29, No. 2, Revised on Sep. 8, 2018, Mar. 12, 2019, pp. 1-9.
Gao J., "Modern Communication System", Mechanical Engineering Press, 3rd Edition, Aug. 31, 2009, 244 pPages, pp. 88-90.

* cited by examiner

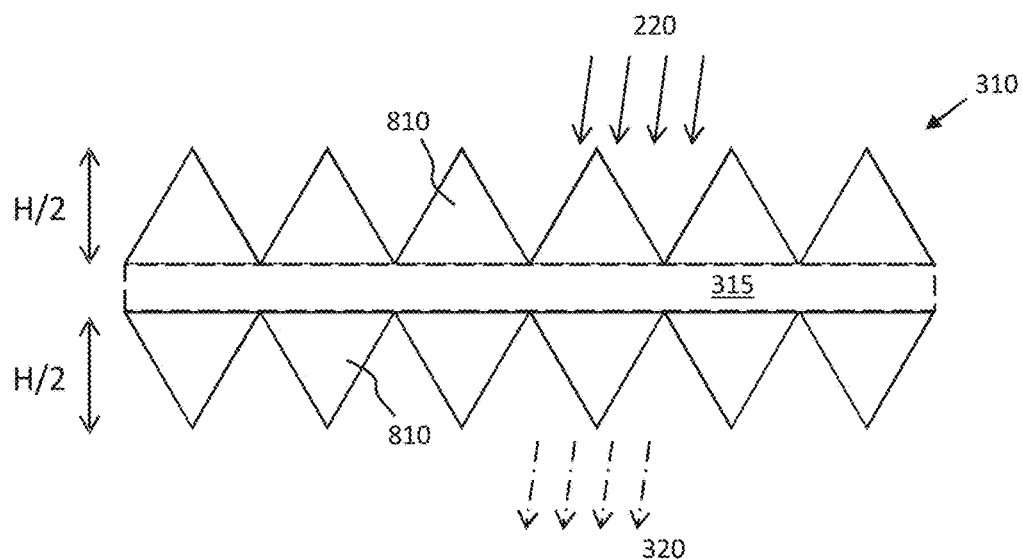
FIG. 8
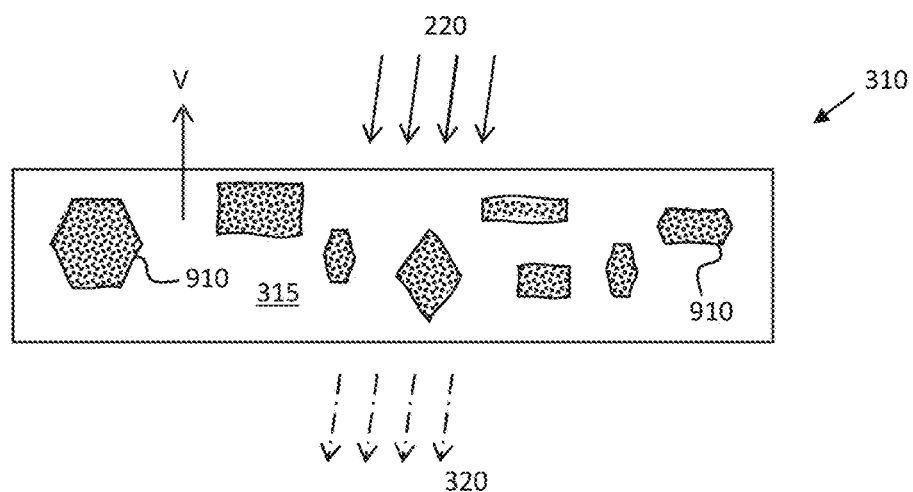
FIG. 9
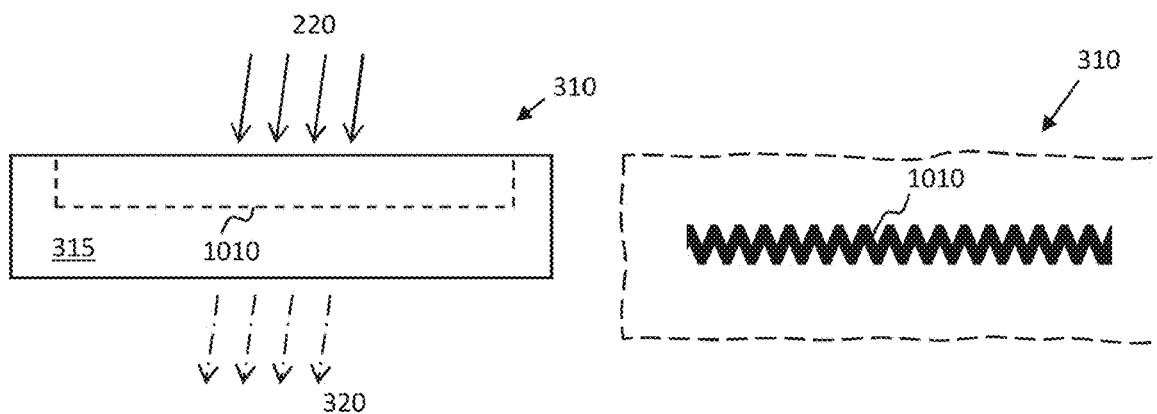
FIG. 10A
FIG. 10B

RADAR SIDE-SHIELD AND A RADAR TRANSCEIVER ASSEMBLY

CROSS-REFERENCE TO RELATED APPLICATIONS

This application is a 35 U.S.C. § 371 national phase of PCT International Application No. PCT/EP2020/076356, filed Sep. 22, 2020, which claims the benefit of priority under 35 U.S.C. § 119 to European Patent Application No. 19199391.4, filed Sep. 24, 2019, the contents of which are incorporated herein by reference in their entirety.

FIELD OF THE INVENTION

The present disclosure relates to radar transceivers and in particular to installation of radar transceivers in vehicles.

BACKGROUND

A radar transceiver is a device arranged for transmission and reception of radar signals in a radar frequency band. Radar transceivers are commonly used in vehicles for monitoring vehicle surroundings. Automatic Cruise Control (ACC) functions, Emergency Braking (EB) functions, Advanced Driver Assistance Systems (ADAS) and Autonomous Drive (AD) are some examples of applications where radar data represents an important source of information on which vehicle control may be based.

Vehicle radar transceivers are often arranged hidden behind vehicle body parts, such as a front or a rear vehicle bumper. This placement is often chosen due to aesthetic reasons, but there is also a need to protect the radar transceiver from mechanical impact, moisture and dirt.

A drawback associated with hiding transceivers behind vehicle body parts is that the radar transmission must penetrate the body part in order to monitor the vehicle surroundings. Some of the radar energy is often reflected back from the body part into the cavity behind the body part. This reflected radar energy may appear as a false target, and thus cause erroneous radar target detections.

Some work has been done towards improving the situation;

CN 108016388 discloses a vehicle bumper including a layered structure configured to reduce reflection.

DE 102010028185 relates to vehicle body parts suitable for use with radar transceivers.

Another issue related to radar systems in vehicular applications is the overall system cost. It is desired to reduce cost of the overall vehicle, meaning that the cost of the radar system and its mounting on the vehicle should be kept at a minimum.

SUMMARY

It is an object of the present disclosure to provide embodiments of improved radar transceiver assemblies and installation techniques. This object is achieved by a side-shield for a radar transceiver. The side-shield including a non-uniform delay structure arranged over the side-shield, the non-uniform delay structure being configured to delay a radar signal propagating through the side-shield by a variable amount in dependence of a wavelength of the radar signal and in dependence of a location on the side-shield surface through which the radar signal propagates, thereby steering and/or diffusing the radar signal after propagation through the side-shield. Thus, any focused radar signal energy propagating though the side-shield is de-focused by the phase randomization. This alleviates problems with false detections incurred by reflections in vehicle body parts.

According to aspects of embodiments of the present invention, the non-uniform delay structure has a variable thickness measured along a normal vector of a surface of the side-shield and/or a non-uniform dielectric constant measured along the normal vector. Thus, the side-shield can be cost-effectively manufactured by, e.g., molding.

In accordance with embodiments of the present invention, there are also disclosed herein radar transceivers, assembly methods, and vehicles associated with the above-mentioned advantages.

BRIEF DESCRIPTION OF THE DRAWINGS

The present disclosure will now be described more in detail with reference to the appended drawings, where:

FIGS. 5-10 illustrate example radar side-shields.

DETAILED DESCRIPTION

The exemplary embodiments of the present invention will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
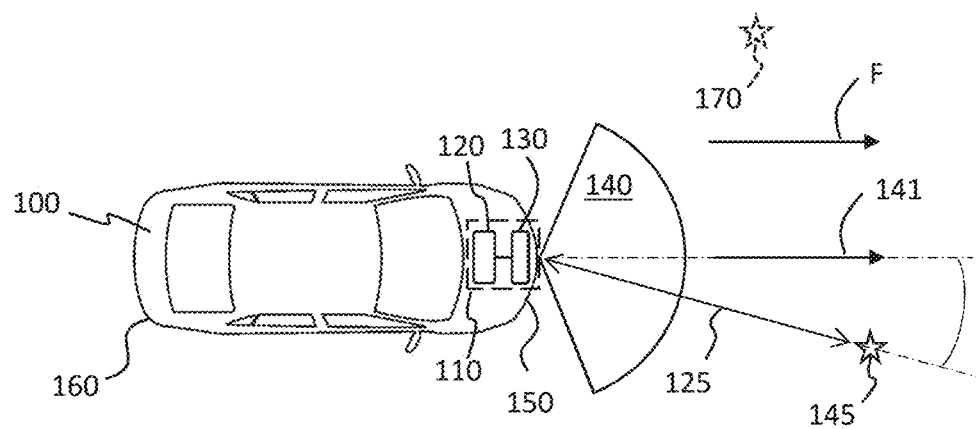
FIG. 1 shows a schematic top view of a vehicle.

FIG. 1 shows a vehicle 100 equipped with a vehicle radar system 110. The system 110 includes a control unit 120 and at least one radar transceiver 130.

The control unit 120 and the radar transceiver 130 may be provided in a single physical unit or they may be distributed over more than one physical unit.

According to an example, the vehicle radar transceiver 130 is arranged for generating and transmitting radar signals in the form of frequency modulated continuous wave (FMCW) signals, sometimes also referred to as radar chirp signals, and to receive reflected radar signals 125, where the transmitted signals have been reflected by an object 145.

The present disclosure is not limited to FMCW radar waveforms. Rather, the disclosed concepts and techniques can be applied to many different radar waveforms. In particular, the techniques disclosed herein are applicable to Orthogonal Frequency Division Multiplex (OFDM) radar, and to Pulse Modulated Continuous Wave (PMCW) radar. One example of OFDM radar is the stepped OFDM radar waveform described in EP3323151 A1.

The radar transceiver 130 is associated with a field of view 140. In case the radar transceiver is a front radar, a boresight direction 141 of the radar often coincides with a center line of the field of view, where the boresight direction 141 here also coincides with a forward direction F of the vehicle 100. In case the vehicle radar is instead configured as a side radar or a rearward facing radar, then the boresight direction may point in some other angle compared to the forward direction F of the vehicle 100.

The radar transceiver 130 is mounted behind a body part of the vehicle 100. This vehicle body part may be, e.g., a front bumper 150 or a rear bumper 160. Reflections in a vehicle body part arranged in front of the radar transceiver may give rise to an increased noise floor and to false detections which are of course undesired. One such false detection 170 is indicated in FIG. 1. The radar sensor and/or the control unit 120 cannot easily distinguish between a false detection 170 and a true target 145. There may be a plurality of false targets 170 complicating radar signal processing.

Reflections in a body part such as a bumper 150, 160 may give rise to unwanted radar side-lobes. Even though a vehicle radar typically has a narrow elevation beam-width, the effect of reflections in vehicle body parts may result in side-lobes at a non-zero elevation (or azimuth), such as pointing more towards the ground. These side-lobes may contribute to an increased level of clutter, which is undesired.

Figure 2:
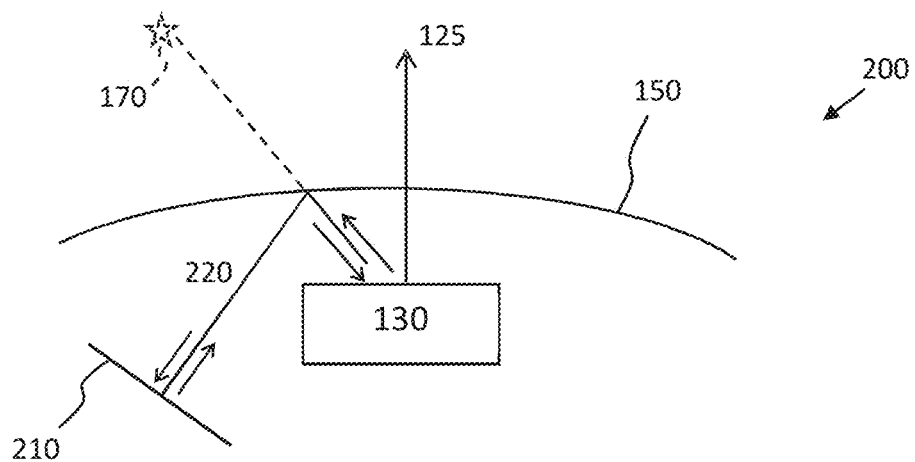
FIG. 2 illustrates radar reflection by a vehicle body part.

FIG. 2 schematically illustrates one cause for false detections. Here, the radar transceiver 130 is arranged behind a bumper 150 which reflects part of the transmitted radar energy 220 back into a cavity behind the bumper 150. The reflected radar energy is incident on some reflective surface 210 on the vehicle 100 which returns the incident reflection. This return may at least in part end up back at the radar transceiver 130. Thus, the radar transceiver receives signal energy which appears to have been reflected of a target, but which in reality is a false detection 170. The reflected energy may arrive at the radar transceiver via a single reflection or via reflections in more than one vehicle part.

To reduce problems with false radar detections 170, it is proposed herein to arrange a side-shield in vicinity of the radar transceiver 130. The side-shield is configured to randomize a phase distribution of an electromagnetic wave propagating though the shield.

If the radar signal has been focused by the shape of a vehicle body part, such as a bumper, into a narrow sidelobe (somewhat similar to a satellite dish effect), then the transmission power density may be increased, e.g., 10 dB higher than if the body part was flat. When this focused beam hits the side shield, if it is flat, the phase front will emerge on the far side of the side-shield medium substantially parallel to when it arrived and hence the focused beam will continue to stay focused. However, if the phase front of the radar signal 220 is randomized by propagation through a phase randomizing side-shield, then the beam is no long focused after side-shield penetration and the energy density (in terms of power per solid angle) is reduced. In other words, by randomizing the phase distribution of the radar signal, the radar signal is steered or diffused by the side-shield. This of course happens in both transmit and receive directions. Randomizing a phase distribution here means that the phase front across an outer 2-dimensional surface of a radar side-shield has become randomized, which, e.g., removes any focusing effect that had been achieved by a vehicle body part like a bumper.

Figure 3:
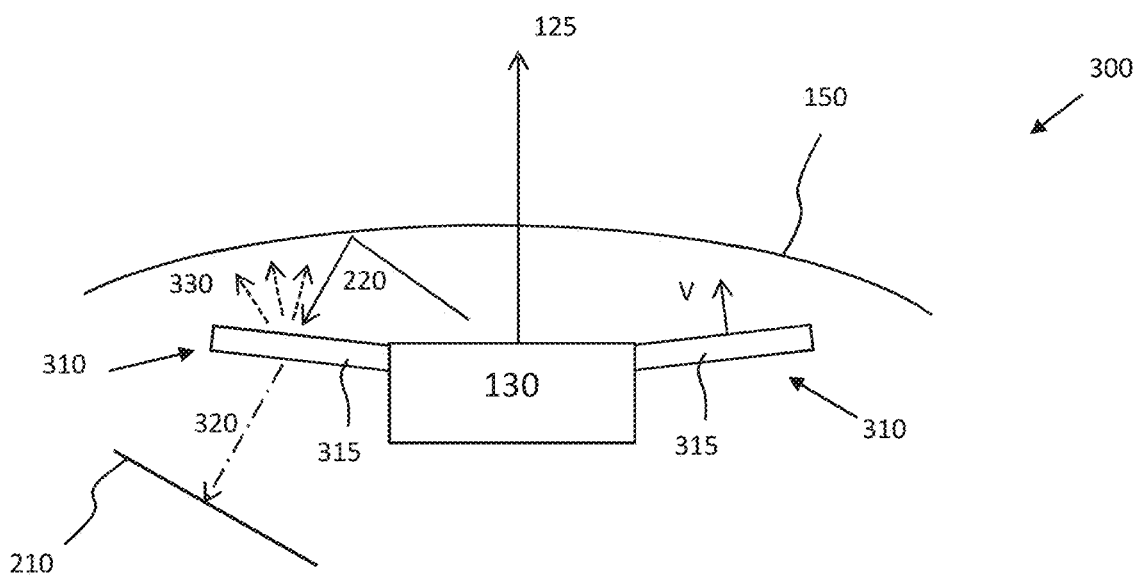
FIG. 3 illustrates radar reflection with a radar side-shield.

FIG. 3 shows an example of a radar transceiver assembly 300 including this type of phase randomizing side-shield 310. A radar side-shield 310 is normally arranged laterally with respect to a transmission direction of the radar transceiver 130, i.e., extending out from the sides of the transceiver housing as schematically illustrated in FIG. 3. The radar side shield extends in an extension plane, such as laterally out from the radar transceiver. However, the side-shield surface may be either planar or curved.

The side-shields 310 discussed herein all incorporate a non-uniform delay structure arranged over the extension plane of the side-shield. The non-uniform delay structure is configured to delay a radar signal 220, 320 propagating through the side-shield 310 by a variable amount in dependence of a wavelength of the radar signal and in dependence of a location on the side-shield through which location the radar signal propagates. This means that the structure is non-uniform in the sense that the phase of a signal component exiting the side-shield 310 depends on where, spatially, the signal component interacts with the side-shield. The effect of the side-shield is a randomization of a phase distribution of the radar signal 320 after propagation through the side-shield 310 as discussed above.

According to some aspects of embodiments of the present invention, the randomized phase distribution is a uniform phase distribution over some angular range, such as from 0 to $\pi$ or 0 to $2\pi$.

The side-shield can be configured with a non-uniform delay structure to generate the phase randomization in some different ways. For instance, according to some aspects, the non-uniform delay structure has a non-uniform (variable) thickness measured along a normal vector V to the extension plane.

In general, the wavelength of a transmitted radar signal in vacuum, denoted $\lambda_0$, is altered when the radar signal propagates through a material having a dielectric constant $\varepsilon$ different from the vacuum permittivity $\varepsilon_0$ to $$\lambda = \frac{\lambda_0}{\sqrt{\varepsilon}}.$$

This effect causes a phase shift of the radar signal when propagating through the material compared to the same radar signal propagating the same distance though vacuum. For example, if a radar signal with wavelength $\lambda_0$ in vacuum propagates through a material with thickness x and dielectric constant $\varepsilon$, the phase shift of the signal due to propagating through the material is approximately $$\phi = \frac{2\pi x}{\lambda_0 / \sqrt{\varepsilon}}.$$

The signal velocity is the speed at which a wave propagates. Signal velocity is usually equal to group velocity (the speed of a short "pulse" or of a wave-packet's middle or "envelope"). However, in a few special cases (e.g., media designed to amplify the front-most parts of a pulse and then attenuate the back section of the pulse), group velocity can exceed the speed of light in vacuum, while the signal velocity will still be less than or equal to the speed of light in vacuum.

In a transmission medium, signal velocity vs is the reciprocal of the square root of the capacitance-inductance product, where inductance and capacitance are typically expressed as per-unit length;

$$v_s = \frac{c}{\sqrt{\varepsilon_r \mu_r}} \approx \frac{c}{\sqrt{\varepsilon_r}}$$

where $\varepsilon_r$ is the relative permittivity of the medium, $\mu_r$ is the relative permeability of the medium, and c is the speed of light in vacuum. The approximation shown is used in many practical contexts because for most common materials $\mu_r \approx 1$.

Figure 4:
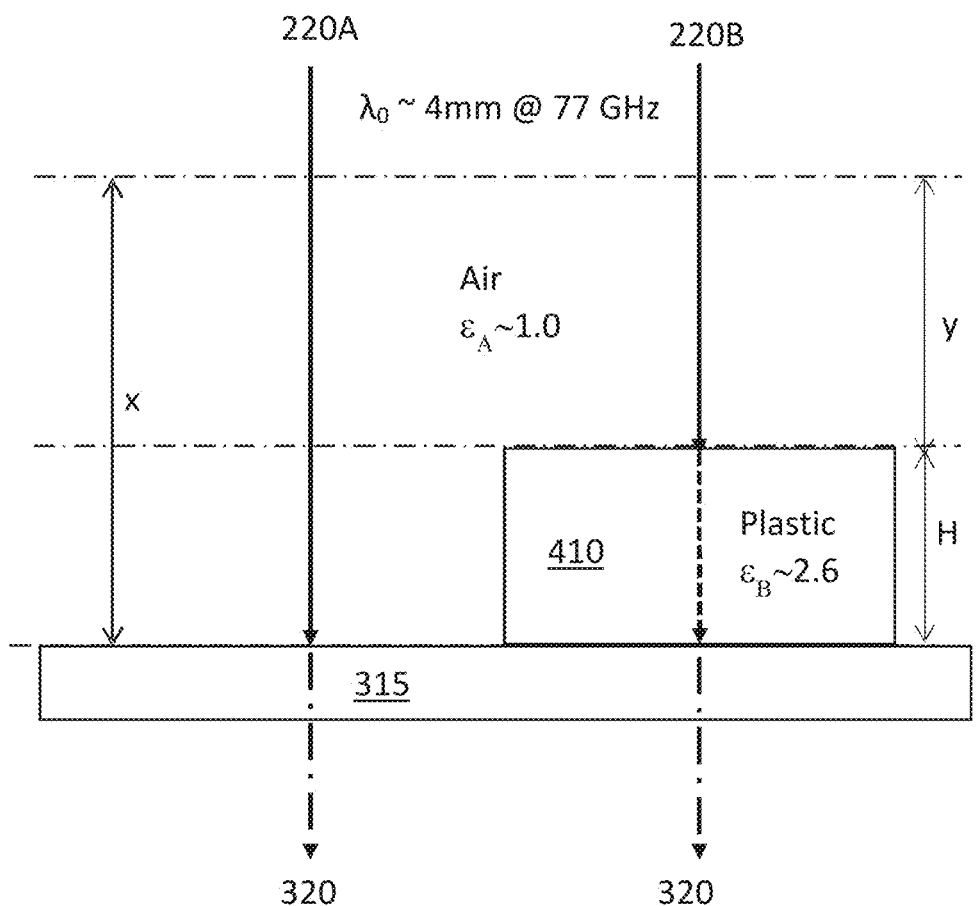
FIG. 4 illustrates radar propagation through different media.

With reference to FIG. 4, consider two components 220A, 220B of a propagating radar signal at a normal incidence angle. A first component 220A propagates a first distance x in air, having a first dielectric constant LA. A second component 220B also propagates the first distance x, where the second component 220B then first propagates a second distance y in air, having the first dielectric constant LA, and then propagates a third distance H that correspond to a height H of a protruding portion 410 made in a dielectric material having a second dielectric constant $\varepsilon_B$. The protruding portion 410 is for example made in a plastic material. According to some aspects, the second dielectric constant LB is between 2 and 3, for example about 2.6.

Since the first component 220A propagates the first distance x in air only, and the second component 220B propagates the first distance x partially in air and partially through the protruding portion 410, the first component 220A and the second component 220B will have mutually different respective relative phases $\varphi_1$, $\varphi_2$ after having propagated the first distance x.

These relative phases $\varphi_1$, $\varphi_2$ of the two components 220A, 220B is $$\varphi_1 = \frac{2\pi x}{\lambda} = \frac{2\pi x}{\lambda_0 / \sqrt{\varepsilon_A}} \approx \frac{2\pi x}{\lambda_0 / \sqrt{1.0}}$$

$$\varphi_2 = \frac{2\pi(x-y)}{\lambda_0 / \sqrt{\varepsilon_A}} + \frac{2\pi y}{\lambda_0 / \sqrt{\varepsilon_B}} \approx \frac{2\pi(x-y)}{\frac{\lambda_0}{\sqrt{1.0}}} + \frac{2\pi y}{\frac{\lambda_0}{\sqrt{2.6}}}.$$

In order to randomize $\varphi_2$ relative to $\varphi_1$ within an approximate range from 0 to $\pi$, the height H is preferably chosen in the range 0 mm to $$\frac{\lambda_0}{2(\sqrt{2.6} - 1)}.$$

For an automotive radar operating around 77 GHz, where the wavelength $\lambda_0$ in air is approximately 4 mm, the maximum height H then evaluates to approximately 3 mm.

Rays at other incidence angles than the normal angle will of course have a larger phase difference since the effective distance through the plastic cuboid-shaped protruding element will be longer.

Figure 5A:
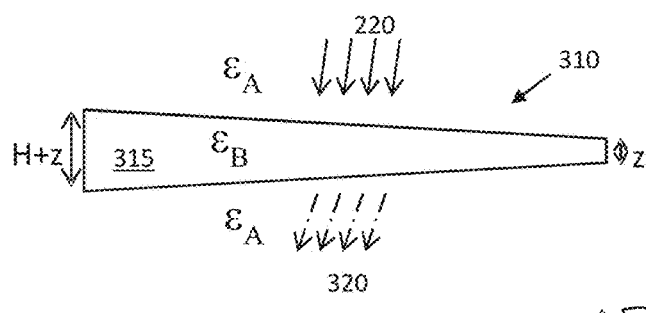

One example of a side-shield 310 having non-uniform thickness is a side-shield including a carrier structure 315 which tapers off in some direction, e.g., as a wedge-shaped side-shield illustrated in FIG. 5A that tapers from a thickness z mm to a thickness H+z mm. A radar signal component exiting the side-shield then has a phase in dependence of where it penetrated the side-shield since the thickness varies over the side-shield. Radar signal components penetrating the side-shield at the thickest end propagates through a material thickness of about H+z mm, while a radar signal component propagating through the thinnest end only experiences a side-shield thickness of about z mm. The wedge-shaped side-shield also bends the signal 320 to the left, i.e., the exiting radar signal 320 is not parallel to the incoming signal 220 due to the effects of diffraction by the side-shield. This is a beneficial effect of the wedge—to deviate the energy away from a reflecting surface if it were known that one were present.

Figure 5B:
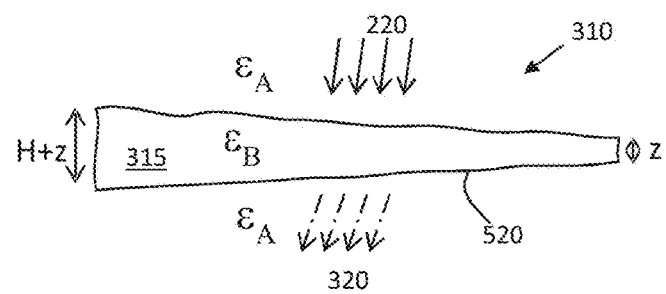

FIG. 5B shows an example of a tapered radar side-shield which also includes uneven surfaces 520 to further randomize the phase of a radar signal propagating though the side-shield.

Another example of a side-shield having non-uniform delay structure is a side-shield including a carrier structure 315 and a plurality of protruding portions. Examples of different types of protruding portions 610, 710, 810, 1210 are schematically illustrated in FIGS. 6-8 and 12. Each protruding portion is configured to delay a radar signal 220, 320 propagating through the side-shield 310 by a respective amount, in dependence of a wavelength of the radar signal. Due to the variable delay amounts, the radar signal will include components having different phases after propagation through the side-shield. In other words, making the side shield patterned rather than using a typical flat surface has the effect of randomizing the phase front that propagates beyond the side shield. This phase randomization diffuses the radar signal.

For example, adding pyramids or other protrusions to the inner and/or outer surface of the side-shield 310 will randomize the phases of the signal appearing on the outer surface, thus broadening and reducing the intensity of any side-lobes.

Figure 6:
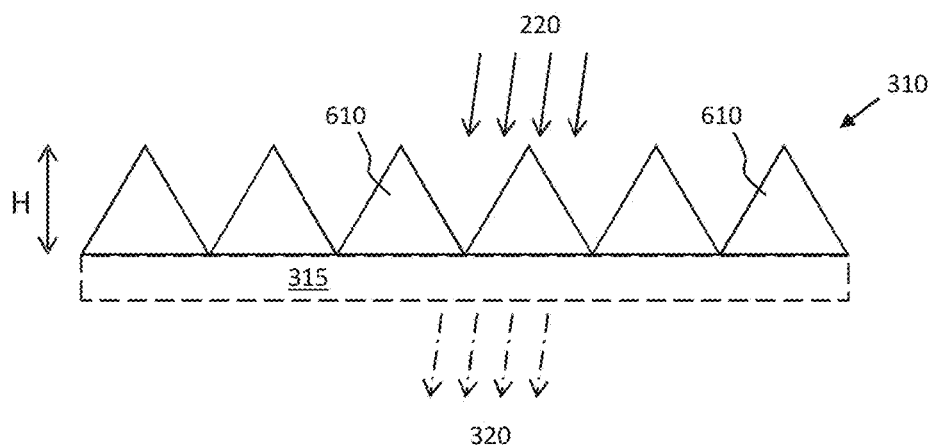
Figure 7:
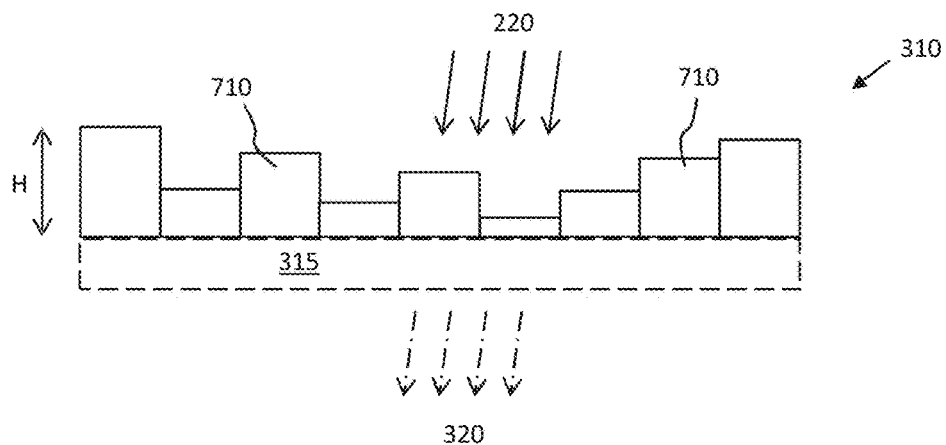

With reference to the examples shown in FIGS. 6-8, the plurality of protruding portions 610, 710, 810 are configured to randomize a phase distribution of the radar signal 320 after propagation through the side-shield 310. This can be achieved, e.g., by configuring the protruding portions with different shapes and/or with materials having different dielectric constants. For instance, at least one of the protruding portions may be formed as a pyramid-shaped protruding portion 610, exemplified in FIG. 6. A pyramid-shaped protruding portion 610 will subject a radar signal to different propagation delays depending on where the radar signal propagates through the side-shield. The protruding portions may also be formed in other shapes, such as the cuboid-shaped protrusions 710 exemplified in FIG. 7.

FIG. 8 shows pyramid-shaped protruding portions 810 on both sides of a carrier structure 315. The pyramid-shaped protruding portions 810 on each side have a height of H/2, such that the total height of the pyramid-shaped protruding portions 810 is H.

This is applicable for all types of protruding portions, according to some aspects the protruding portions 610, 710, 810 may be arranged on one or both sides of the side-shield, i.e. they may be arranged on a first face of the side-shield and/or on a second face of the side-shield opposite to the first face.

The protruding portions may also be formed as polygon-shaped protruding portions. A blend of different shapes can be used to generate a desired phase randomization effect.

According to some aspects, as shown in FIG. 6-8, the protruding portions 610, 710, 810 are supported by a carrier structure 315. This is, however, optional as indicated with dashed lines for the carrier structure 315 in FIG. 6-8. The carrier structure is not necessary if the protruding portions 610, 710, 810 form a coherent piece of material that is self-supporting.

If a carrier structure 315 is used, such a carrier structure can have a dielectric constant that is the same as, or differs from, a dielectric constant of the protruding portions 610, 710, 810. The carrier structure 315 can also have any suitable shape, for example tapered as shown in FIG. 5A.

Combinations of different types of protruding portions 610, 710, 810 can according to some aspects be used.

According to some aspects, a protruding portion 610, 710, 810 is associated with a height in a range from 0 to H mm, measured in an extension direction of the protruding portion, from the carrier structure 315. The height H can be determined in dependence of a radar transmission wavelength in vacuum $\lambda_0$ and a dielectric constant $\varepsilon$ of a material in the protruding portion. For example, a height range from 0 to H mm can be determined as $$H = \frac{\lambda_0}{2(\sqrt{\varepsilon}-1)} \text{mm},$$

which gives a phase distribution from 0 radians to $\pi$ radians. The height range can also be expanded to include heights in a range from 0 to H' mm where $$H' = 2\frac{\lambda_0}{2(\sqrt{\varepsilon}-1)} \text{mm},$$

which gives a phase distribution from 0 radians to $2\pi$ radians. The height range can also be selected somewhere in-between in order to generate phase randomization.

At least some of the side-shields disclosed herein can be cost-effectively manufactured by integrally forming the protruding portions and the carrier structure in a plastic material. I.e., the radar side-shield 310 may be formed in a single piece by molding a plastic material, which is an advantage.

Plastic materials may consist of any of a wide range of synthetic or semi-synthetic organic compounds that are malleable and so can be molded into solid objects. Plasticity is the general property of all materials which can deform irreversibly without breaking but, in the class of moldable polymers, this occurs to such a degree that their actual name derives from this specific ability. Plastics are typically organic polymers of high molecular mass and often contain other substances. They are usually synthetic, most commonly derived from petrochemicals.

Alternatively, or as a complement to molding the side-shield in a single piece, the protruding portions 610, 710, 810 can be attached to the carrier portion 315 by any of; an adhesive layer, a snap-fit mechanism, an interference fit mechanism, and/or by ultrasonic welding.

Thermoplastic olefin (TPO) or other plastic is a preferred material for manufacturing the radar side-shield. Radar absorbing plastics are available, however the properties can be different, it is more expensive, and can be more complicated to mold and weld.

A phase randomization of a radar signal propagating through the side-shield can also be obtained by adding chunks of material to the carrier structure 315, where the added material is of a different dielectric constant compared to that of the carrier structure material.

FIG. 9 illustrates one such example radar side-shield where the non-uniform delay structure has a non-uniform dielectric constant along the normal vector V. This means that the dielectric constant experienced by an electromagnetic signal component propagating through the side-shield is different at different locations over the side shield 310. The embedded portions 910 are associated with a dielectric constant $\varepsilon$ different from a dielectric constant of the carrier structure 315. The embedded portions 910 are preferably formed with different shapes to cause the phase randomization discussed above. It is also possible to add embedded portion which have been formed in different materials having different dielectric constants. According to some aspects, the non-uniform delay structure has a non-uniform dielectric constant along the normal vector V, but a uniform thickness. It is of course conceivable that the non-uniform delay structure according to FIG. 9 has a non-uniform thickness as well.

FIGS. 10A and 10B schematically show a side view and a top view of a radar side-shield 310 where an irregular or piecewise linear trench 1010 has been formed in the side-shield surface. This trench also has the effect of randomizing phase distribution.

Figure 10C:
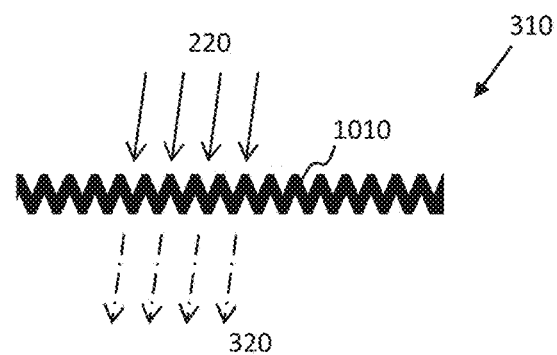

The side-shield 310 can also be formed having an irregular or zig-zag shaped surface, as exemplified in the side-view shown in FIG. 10C. FIG. 10C shows a side view of a radar side-shield 310 with zig zag pattern on inner and outer surfaces. This has the advantage of a more constant material thickness for molding. Both top and bottom surfaces of the side-shield 310 take on the irregular shape in order to maintain a more constant thickness of material for ease of molding.

Figure 11:
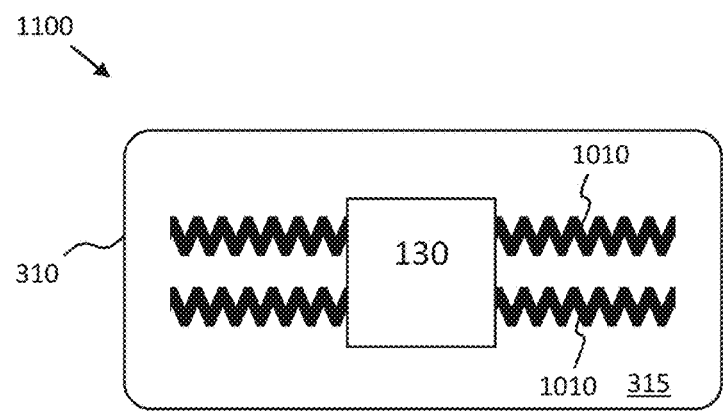
FIGS. 11-12 shows example radar transceiver assemblies.
Figure 12:
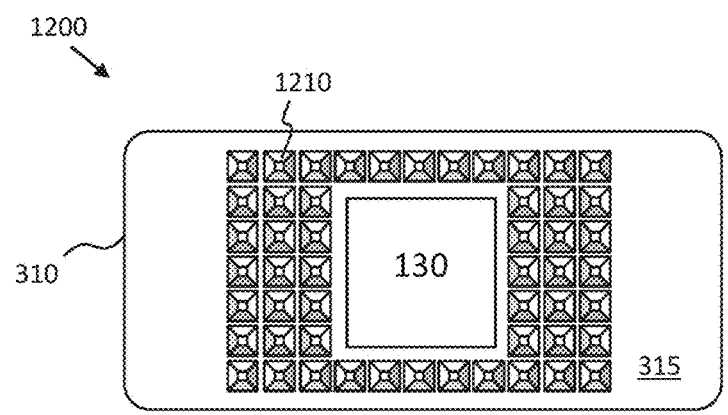

FIG. 11 schematically illustrates a radar transceiver assembly 1100 where zig-zag trenches have been formed into the (normally flat) surface of the radar side-shield 310 that here is shown together with the radar transceiver 130.

It may not be necessary to add the protruding portions to the entire side-shield. Thus, according to some aspects, the one or more protruding portions 1210 are provided within a part of a surface of the carrier structure 315, as exemplified in FIG. 12 which shows an example radar transceiver assembly 1200 including a radar transceiver 130 and a side-shield 310 according to the discussion above.

Figure 13:
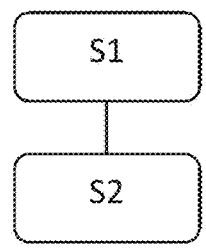
FIG. 13 is a flow chart illustrating a production method.

FIG. 13 is a flow chart illustrating methods. In particular, there is illustrated a method for producing a side-shield 310 for a radar transceiver 130. The method includes; configuring S1 a mold for molding a plastic element, wherein the mold is configured to form one or more protruding portions arranged protruding from a carrier structure 315 of the side-shield and/or an irregular trench in a surface of the side-shield, and producing S2 the side-shield 310 by forming a plastic material by the mold.

The present disclosure is not limited to the examples described above, but may vary freely within the scope of the appended claims. For example, the radar transceiver 130 can according to some aspects be completely or partially circumvented by the radar side-shield 310, or positioned at an offset distance from the radar side-shield 310.

While the above description constitutes the preferred embodiment of the present invention, it will be appreciated that the invention is susceptible to modification, variation and change without departing from the proper scope and fair meaning of the accompanying claims.

The invention claimed is:

1. A side-shield for a radar transceiver, the side-shield comprising:
    a non-uniform delay structure comprising:
        a first dielectric material; and
        a plurality of embedded portions of at least one second dielectric material of different dielectric constant than the first dielectric material, each of the plurality of embedded portions being surrounded by, and thus physically separated by, the first dielectric material;
    the non-uniform delay structure being configured to have a radar signal propagate therethrough and to delay the radar signal propagating through the non-uniform delay structure by a variable amount in dependence of a wavelength of the radar signal and in dependence of a location on the non-uniform delay structure through which the radar signal propagates, to thereby diffuse the radar signal by phase randomization due to propagation through the non-uniform delay structure.

2. The side-shield according to claim 1, wherein the non-uniform delay structure has a variable thickness measured along a normal vector of a surface of the side-shield or a non-uniform dielectric constant measured along the normal vector.

3. The side-shield according to claim 1, wherein the non-uniform delay structure comprises a carrier structure and a plurality of protruding portions, wherein each of the protruding portions are configured to delay the radar signal propagating through the side-shield by a respective and variable amount in dependence of the wavelength of the radar signal, thereby randomizing a phase distribution of the radar signal after propagation through the side-shield.

4. The side-shield according to claim 3, wherein the protruding portions and the carrier structure are integrally formed in a plastic material.

5. The side-shield according to claim 3, wherein the protruding portions are attached to the carrier portion by any of; an adhesive layer, a snap-fit mechanism, an interference fit mechanism, or by ultrasonic welding.

6. The side-shield according to claim 3, wherein each of the plurality of protruding portions is associated with a height in a range from 0 to H millimeter (mm), measured from the carrier structure in an extension direction of the protruding portion, wherein the height H depends on a radar transmission wavelength in vacuum $\lambda_0$ and a dielectric constant $\varepsilon$ of a material in the protruding portion.

7. The side-shield according to claim 6, wherein the height H is given by $$H = \frac{\lambda_0}{2(\sqrt{\varepsilon} - 1)}.$$

8. The side-shield according to claim 6, wherein the height H is in a range 2-4 mm.

9. The side-shield according to claim 3, wherein at least one of the plurality of protruding portions is one or more of a pyramid-shaped protruding portion, a cuboid-shaped protruding portion, an irregular or piecewise linear trench, or a polygon-shaped protruding portion.

10. The side-shield according to claim 3, wherein one or more of the protruding portions are within a part of a surface of the carrier structure.

11. The side-shield according to claim 1, wherein the non-uniform delay structure is configured to have the radar signal enter a first surface of the non-uniform delay structure, propagate through the non-uniform delay structure, and exit a second surface of the non-uniform delay structure, wherein at least the first surface of the non-uniform delay structure has a non-uniform, non-repetitive cross-sectional shape.

12. The side-shield according to claim 11, wherein both the first surface and the second surface of the non-uniform delay structure have non-uniform, non-repetitive cross-sectional shapes.

13. The side-shield according to claim 11, wherein the non-uniform delay structure has a generally wedge-shaped cross-section, with a first thickness at a first end of the cross-section being smaller than a second thickness at a second end of the cross-section, wherein the radar signal, in addition to being diffused by propagation through the non-uniform delay structure, is directed away from a propagation path between the side-shield and a receiver of the radar transceiver.

14. The side-shield according to claim 1, wherein at least two of the plurality of embedded portions have at least one of different sizes relative to each other and different shapes relative to each other.

15. A radar transceiver assembly including a radar transceiver and a side-shield according to claim 1.

16. A vehicle including the radar transceiver assembly according to claim 15.

* * * * *